Patented May 8, 1934

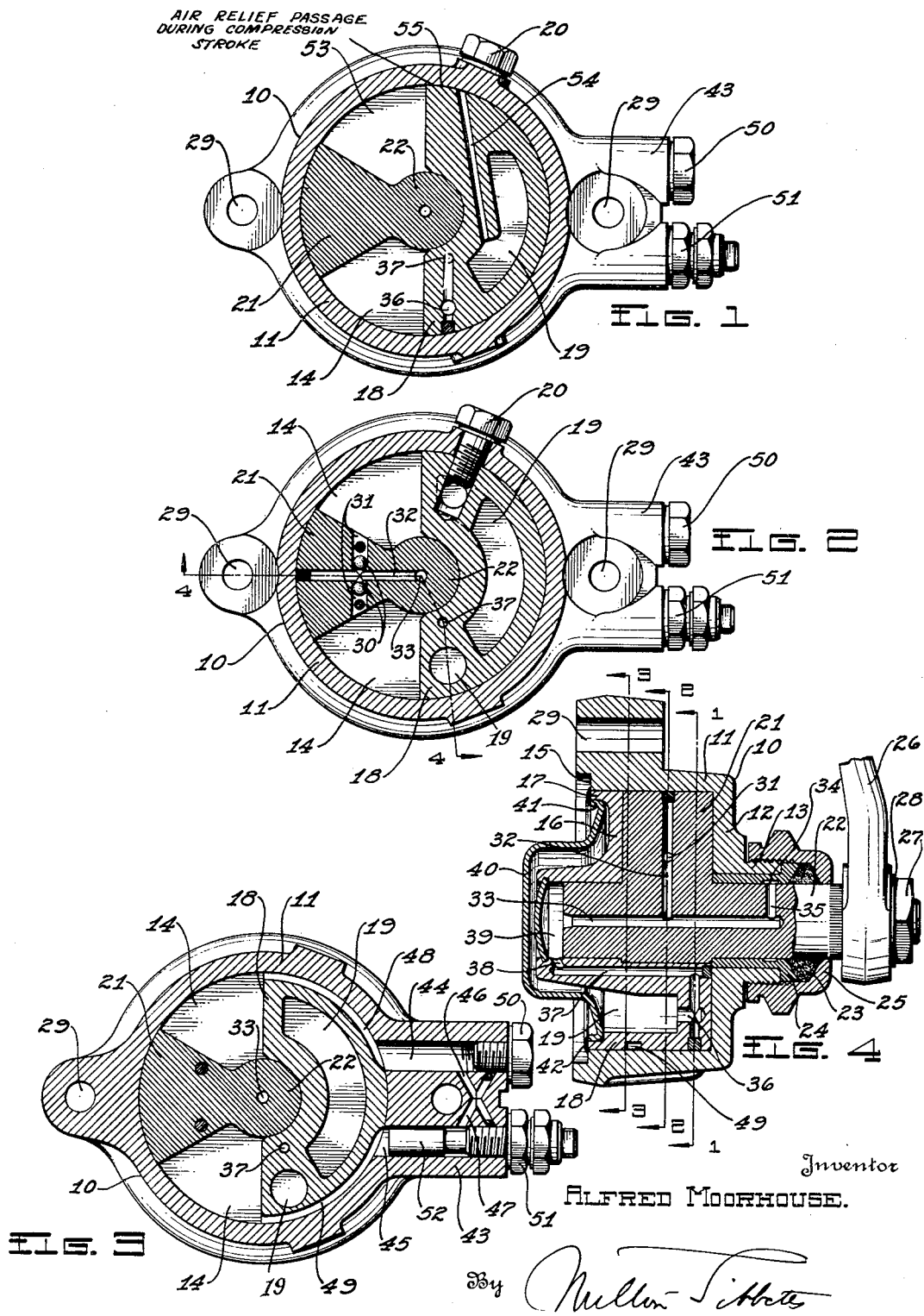

1,957,793

UNITED STATES PATENT OFFICE 1,957,793

SHOCK ABSORBER

Alfred Moorhouse, Detroit, Mich., assignor to Packard Motor Car Company, Detroit, Mich., a corporation of Michigan Application December 24, 1928, Serial No. 328,168

3 Claims. (Cl. 188—89)

This invention relates to shock absorbers and more particularly to hydraulic shock absorbers adapted for use with motor vehicles.

It is substantially impossible to entirely eliminate air from the interior of hydraulic shock absorbers because a limited quantity is always injected with the fluid when originally inserted or during replenishment. The presence of air in a shock absorber of the fluid type is objectionable because it collects in the working chamber, on the upper side of the piston, in varying quantities thereby disturbing the calculated resistance to the movement of the piston, and further, because it will circulate with the fluid and displace the calculated quantity of fluid traveling from one side of the piston to the other in the piston chamber. It is an object of the present invention to overcome the above objectionable conditions in a shock absorber by providing for the elimination of air from the fluid system during operation of the piston.

Another object of my invention is to provide a hermetically sealed hydraulic shock absorber in which air in the fluid, or in the working chamber, will automatically be removed and trapped.

A further object of the invention is to provide a hydraulic shock absorber having a closed casing in which the fluid in a reserve chamber is utilized to trap air ejected from the working chamber.

Other objects of the invention will appear from the following description taken in connection with the accompanying drawing which forms a part of this specification and in which:

Fig. 1 is a vertical sectional view of a shock absorber taken on line 1—1 of Fig. 4, with which my invention is incorporated;

Fig. 2 is a similar sectional view taken on line 2—2 of Fig. 4;

Fig. 3 is a similar sectional view of the shock absorber taken on line 3—3 of Fig. 4, and Fig. 4 is a vertical sectional view of the shock absorber taken on line 4—4 of Fig. 2.

Referring to the drawing, 10 is the body or casing of the shock absorber having a cylindrical portion 11, and end wall 12 and a bearing portion 13. The cylindrical portion and end wall form a fluid containing working chamber 14 for the shock absorber, and the cylindrical portion 11 is provided with an annular end portion 15 for a purpose presently to appear. An inner cover or closure 16 is inserted in the open end of the casing and is provided with an annular flange 17 adapted to be positioned contiguous to the end portion 15 of the casing. The cover or closure 16 has a semi-cylindrical extension 18 fitting closely into the cylindrical portion 11 of the casing, the extension being preferably cored out to form an auxiliary reservoir or reserve tank 19. A filling opening for the reservoir is provided by aligned passages in the casing and the extension 18, and such opening is closed by a plug 20. Both the working chamber and reservoir are substantially filled with any suitable liquid such as oil, glycerine or a fluid having similar characteristics, but some space above the liquid level in the reservoir is left to allow for expansion of the liquid and for another purpose presently to appear.

A vane piston 21, mounted to oscillate in the working chamber 14, has a shaft 22 suitably supported in the casing and cover. The packing 23 is compressed against the bearing sleeve 24 by a hollow nut 25 screwed on the bearing portion 13 of the casing. Outwardly of nut 25, shaft 22 is serrated and an arm 26 is mounted upon the serrated portion and held thereon by nut 27 and lock washer 28. The shock absorber is adapted to be mounted upon a suitable support by bolts extending through openings 29 in the casing. Arm 26 is adapted for connection, in any suitable manner, to a part which moves relative to the support upon which the absorber is mounted so that the piston will be operated in the working chamber as the vehicle parts move relative to each other. Piston 21 is provided with a pair of check valves 30 arranged in passages 31 which communicate with a passage 32 and which in turn connects with a passage 33 in shaft 22. An annular leakage groove 34 is formed in bearing sleeve 24 and a short passage 35 connects this leakage groove with passage 33. Any liquid escaping from the working chamber in the direction of the bearing sleeve 24 will be caught in the leakage groove 34 and drawn back into the working chamber through passages 35, 33, 32 and 31, and past check valves 30 by reason of the suction existing on the receiving side of the piston. Liquid may be drawn into the working chamber from the lowermost part of the auxiliary reservoir 19 when needed through connected passages 36, 37, 38, 39, 33, 32 and 31 and past check valves 30.

An outer cover in the form of a plate 40 having an annular flange 41 pressed into a cylindrical portion of the inner cover 16 formed by the annular flange 17 provides an enlargement of reservoir 19. As may be seen in Fig. 4 of the drawing, flange 41 of the outer cover and flange 17 of the inner cover are adapted to be positioned contiguously.

The flange ends 17 and 41 of the cover members are arranged to lie adjacent the edge portion 15 of the casing and are welded together as shown at 42, thereby providing an integral connection which is hermetically sealed at such joints. The packing 23 at the other end of the casing also provides a seal so that the interior of the assembled casing is entirely hermetically sealed.

The shock absorber casing is provided with a projecting boss 43 having spaced passages 44 and 45 arranged with their axes parallel and substantially normal to the axis of shaft 22. The passages 44 and 45 are connected near the outer end of the boss 43 by means of intersecting passages 46 and 47, and passage 44 is connected with the working chamber 14 of the shock absorber on one side of the piston by means of an arcuate groove 48 in the periphery of the cylindrical portion of the extension 18, and a passage 45 is similarly connected with the working chamber on the opposite side of piston 21 by means of an arcuate groove 49 in the periphery of the extension 18. The outer end of the passage 44 is closed by a plug member 50, and a plug member 51 carrying a metering device 52 is secured in the passage 45.

The groove 48 and the casing adjacent thereto, the passage 44, the passages 46 and 47, the passage 45 and the groove 49 provide duct means within the casing and cover through which liquid can be moved from one portion to another of the working chamber on opposite sides of the piston thereby partially relieving the pressure created by the piston. The oscillating piston 21 when moving toward either of the arcuate grooves 48 or 49 will compress the fluid within the chamber between it and the extension 18 and force a portion of the same through the duct means and the metering device into the fluid working chamber on the opposite side of the piston.

When the shock absorber is installed, the space 53 is the upper portion of the working chamber. Any air which might be enclosed within the casing will eventually travel into the upper portion of the working chamber, and it is to the elimination of such collection of air in the working chamber that this invention is directed. To this end I provide duct means for establishing communication between the upper portion of the working chamber and the liquid reservoir so that air can be forced into the reservoir by the normal piston action and trapped above the fluid level therein. The extension 18 of the cover is formed to have a close fit with the surrounding wall of the casing member 10. A passage 54 is provided through the extension member 18, the lower end of such passage entering the reservoir chamber below the level of the fluid therein, while the upper end extends through the periphery of the cylindrical extension adjacent the casing. The pressure developed within the working chamber by the piston is high, and sometimes reaches approximately 3,000 pounds, so that such pressure will slightly bulge the upper portion of the casing 10 indicated at 55 adjacent the extension 18 which permits the air compressed by the piston 21 in the upper part of the working chamber to be forced through such space between the periphery of the extension and the casing and the passage 54, into the reservoir 19. Any air entering the reservoir 19 will rise through the liquid and will collect in the upper portion thereof where it is trapped by the liquid. Any air within the working chamber or connecting passages will eventually travel into the upper portion of the working chamber where it will be automatically forced into and trapped within the liquid reservoir. Any fluid forced through the air duct means will collect with the fluid in the reservoir from which it will circulate again to the working chamber.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of the invention.

Having thus described the various features of my invention, what I claim and desire to secure by Letters Patent is:

1. In a shock absorber, a closed casing forming a liquid containing chamber and a reservoir, said chamber and reservoir being arranged in communication, a piston movable in the chamber, abutment means for the piston, and air relief duct means leading to the reservoir from the chamber, a portion of the duct means being enlarged by pressure within the chamber.

2. In a shock absorber, a closed casing including a cover, said casing providing a liquid containing chamber and a reservoir arranged in communication, a piston movable in the chamber, and air relief duct means extending from the chamber between said casing and cover and then directly through said cover to the reservoir.

3. In a shock absorber, a closed casing including an outer cover, abutment means fitting closely within said casing and providing therewith a communicating piston chamber and reservoir, a piston movable in the chamber, and non-return air relief duct means between the chamber and the reservoir, a portion of said duct means extending through a portion of said abutment means and another portion of said duct means being formed by piston created pressure between the abutment and the casing.

ALFRED MOORHOUSE.